United States Patent
Arbanas et al.

(10) Patent No.: US 7,775,137 B2
(45) Date of Patent: Aug. 17, 2010

(54) ADJUSTABLE STEERING COLUMN FOR A MOTOR VEHICLE

(75) Inventors: Viktor Arbanas, Baden (CH); Michael Maag, Gams (CH)

(73) Assignee: Thyssen Krupp Presta Aktiengesellschaft, Eschen (LI)

(*) Notice: Subject to any disclaimer, the term of this patent is extended or adjusted under 35 U.S.C. 154(b) by 26 days.

(21) Appl. No.: 12/222,772

(22) Filed: Aug. 15, 2008

(65) Prior Publication Data

US 2009/0013818 A1  Jan. 15, 2009

Related U.S. Application Data

(63) Continuation of application No. PCT/EP2007/000758, filed on Jan. 30, 2007.

(30) Foreign Application Priority Data

Feb. 16, 2006  (DE) .................. 10 2006 007 553

(51) Int. Cl.
    *B62D 1/18* (2006.01)
(52) U.S. Cl. ........................ 74/493; 280/775
(58) Field of Classification Search ............ 74/492, 74/493, 498; 280/775, 777
    See application file for complete search history.

(56) References Cited

U.S. PATENT DOCUMENTS

| 5,927,152 A | 7/1999 | Marzio et al. |
| 6,095,012 A | 8/2000 | Lutz |
| 2004/0155448 A1 | 8/2004 | Klukowski et al. |
| 2008/0087129 A1 * | 4/2008 | Kaneko et al. ............ 74/493 |

FOREIGN PATENT DOCUMENTS

| DE | 102 61 538 | 7/2004 |
| DE | 103 37 585 | 3/2005 |
| EP | 1 591 342 | 2/2008 |

OTHER PUBLICATIONS

International Search Report issued Apr. 23, 2007 in the International (PCT) Application of which this is a continuation application.

* cited by examiner

*Primary Examiner*—Thomas R Hannon
*Assistant Examiner*—Phillip A Johnson
(74) *Attorney, Agent, or Firm*—Wenderoth, Lind & Ponack, L.L.P.

(57) ABSTRACT

An adjustable steering column for a motor vehicle includes a steering spindle, a jacket unit bearing the steering spindle, a bracket unit, mountable on the chassis of the motor vehicle, with at least one side jaw, which extends laterally of the jacket unit and bears the jacket unit (3), an openable and closable securement device which includes a clamp bolt penetrating elongated holes in the jacket unit and in the at least one side jaw, as well as at least one bracing part penetrated by the clamp bolt. The at least one bracing part is implemented in the form of a substantially planar plate. A connection with the jacket unit and the side jaw, displaceable into the particular displacement direction of the steering column and nondisplaceable into the particular other displacement direction, is completed through at least one bolt penetrating an elongated hole, wherein the bolt is connected with one of the two parts to be connected nondisplaceably into both displacement directions and the elongated hole is disposed in the other of the two parts to be connected and extends in the particular displacement direction.

12 Claims, 8 Drawing Sheets

ADJUSTABLE STEERING COLUMN FOR A MOTOR VEHICLE

This is a continuation of International Application No. PCT/EP2007/000758, filed Jan. 30, 2007, the entire disclosure which is incorporated herein by reference.

BACKGROUND OF THE INVENTION a) Field of the Invention

The invention relates to an adjustable steering column for a motor vehicle, which comprises a steering spindle, a jacket unit bearing the steering spindle, a bracket unit, mountable on the chassis of the motor vehicle, with at least one side jaw, which extends laterally of the jacket unit and supports the jacket unit, an openable and closable securement device, in the closed state of the which the jacket unit is nondisplaceably connected with the bracket unit and in the opened state of which the jacket unit is displaceable with respect to the bracket unit into a displacement direction for the length adjustment of the steering column and into a displacement direction for the height or inclination adjustment of the steering column. The steering column also comprises a clamp bolt penetrating elongated holes in the jacket unit and in the at least one side jaw, as well as at least one bracing part penetrated by the clamp bolt, which bracing part, on the one hand, is connected with the jacket unit displaceably into a first of the displacement directions and nondisplaceably into the second displacement direction and, on the other hand, is connected with the or one of the side jaws displaceably into the second displacement direction and nondisplaceably into the first displacement.

b) Description of Related Prior Art

Such an adjustable steering column is disclosed in DE 103 37 585 A1. The bracing part disposed on the outside of one of the side jaws of the bracket unit includes margin bars extending on both sides of the side jaws in the direction toward the jacket unit, which bars are in contact on the curved narrow sides of the side jaws. Thereby between the side jaw and the bracing part a guide is formed curved about the swivel axis serving for the height or inclination adjustment of the steering column. The margin bars of the bracing part include furthermore pin-like extensions, which, for one, are guided displaceably in an elongated hole cutout extending in the longitudinal direction of the steering column, for another, are guided in contact on the underside of the jacket unit displaceably in the longitudinal direction of the jacket unit. Through the form-fit connection acting in each instance in one of the two displacement directions, between the bracing part and the jacket unit a swivelling out of position of the jacket unit about an instantaneous rotational axis in the region of the clamp bolt and extending parallel to such [bolt] is supported in particular in the event of a crash.

Further adjustable steering columns with form-fittingly acting bracing parts, through which a swivelling out of position of the jacket unit with respect to the bracket unit about an axis in the proximity of the clamp bolt is prevented, are disclosed in U.S. Pat. No. 5,927,152 A1 and DE 102 61 538 A1.

One disadvantage in the case of the known designs is that the bracing parts have a relatively complicated three-dimensional form, which leads to an increase of the production costs. If implemented in the form of a sinter part with extensions projecting from a main plane of the bracing part into a third dimension, risks of tearing-off can occur under the action of a high force, as is the case in the event of a crash.

SUMMARY OF THE INVENTION

The problem addressed by the invention is providing a simpler implemented device of the above described type, in which in the event of a crash, nevertheless, a very good bracing of the jacket unit is achieved against a swivelling out of position about an axis located in the proximity of the axis of the clamp bolt and extending parallel to this bolt. This is achieved according to the invention through an adjustable steering column for a motor vehicle comprising a steering spindle, a jacket unit bearing the steering spindle, a bracket unit mountable on the chassis of the motor vehicle with at least one side jaw, which extends laterally of the jacket unit and supports the jacket unit, an openable and closable securement device, in the closed state of which the jacket unit is nondisplaceably connected with the bracket unit and in the open state of which the jacket unit is displaceable with respect to the bracket unit into a displacement direction for the length adjustment of the steering column and into a displacement direction for the height or inclination adjustment of the steering column and which comprises a clamp bolt penetrating an elongated hole in the jacket unit and the at least one side jaw, and at least one bracing part penetrated by the clamp bolt, which, on the one hand, is connected with the jacket unit displaceably into a first of the displacement directions and nondisplaceably into the second displacement direction and, on the other hand, is connected with the or one of the side jaws displaceably into the second displacement direction and nondisplaceably into the first displacement direction. The at least one bracing part is implemented in the form of a substantially planar plate and the connection, displaceable into the particular displacement direction and nondisplaceable into the particular other displacement direction, with the jacket unit and the side jaw takes place in each case through at least one bolt penetrating an elongated hole. The bolt is connected with one of the two parts to be connected nondisplaceably in both displacement directions and the elongated hole is disposed in the other of the two parts to be connected and extends into the particular displacement direction.

Through the formation according to the invention of the at least one bracing part in the form of a substantially planar plate, a very simple production of the same is made possible. The bracing part can, for example, be implemented as a sheet metal stamping. Forces occurring in the event of a crash, in the sense of a swivelling out of position of the jacket unit with respect to the bracket unit about an axis in the proximity of the clamp bolt, can be reliably transmitted via the bolt-elongated hole connections. Overall, at a significantly simplified structure a comparable function as in the known steering column comprising bracing parts, can be attained and to some extent this function can even be improved.

Within the scope of the preferred production of the bracing part as a sheet metal stamping, beads, knobs, guide bars for further additional functions can also be placed into it. In that case, the bracing part is not an exactly planar plate, although for the solution of the problem formulation of the invention a planar plate is sufficient. The term "substantially planar" should be understood under this aspect.

In an advantageous embodiment of the invention such bracing parts can further be applied for holding the jacket unit in the closed state of the securement device under frictional closure. Herein at least two bracing parts can advantageously be provided, between which at least one lamella is disposed which is secured in position on the bracket unit or jacket unit.

BRIEF DESCRIPTION OF THE DRAWINGS

Further advantages and details of the invention will be explained in the following in conjunction with the attached drawings, in which.

DETAILED DESCRIPTION OF THE PREFERRED EMBODIMENTS

An embodiment of a steering column according to the invention is depicted in FIGS. 1 to 10. The steering column includes a steering spindle 1, at the one end 2 of which a steering wheel can be attached. The steering spindle 1 is rotatably bearing supported by a jacket unit 3, which is also referred to as "guide box" or "steering column tube". The jacket unit 3 is supported by a bracket unit 4, which is mountable on the chassis of a motor vehicle. The bracket unit 4 includes side jaws 5, 6 extending on both sides of the jacket unit 3.

In the depicted embodiment the bracket unit 4 comprises a mounting part 7, which is chassis-stationary in the mounted state of the steering column, and a support part 8 which includes the side jaws 5, 6. In normal operation the support part 8 is held nondisplaceably in the mounting part 7 and can, in the event of a crash, after overcoming a connection force become displaced in the manner of a sled with respect to the mounting part 7 in the longitudinal direction of the steering column. The displaced position assumed after a crash is evident in FIG. 3. Such structures are known and the connection between the mounting part 7 and the support part 8 does not need to be explained in further detail here.

In the opened state of a securement device 9 the steering column is adjustable in its length and its inclination or height. The securement device 9 comprises a clamp bolt 12 penetrating intersecting elongated holes 10, 11 in the jacket unit 3 and the side jaws 5, 6. On the clamp bolt 12 is disposed a connecting link disk 13 (cf. FIGS. 6 and 9), which is rotatable by a clamping lever 15 about the longitudinal axis 16 of the clamp bolt 12. The connecting link disk 13 cooperates with a further connecting link disk 14 disposed on the clamp bolt 12 and held nonrotatably with respect to the bolt. By swivelling the clamping lever 15 about the longitudinal axis 16 of the clamp bolt 12, distancing of the connecting link disks 13, 14 occurs (for example through rollers 17 rotatably supported on the connecting link disk 13 which rollers roll out on oblique faces of the connecting link disk 14), whereby the clamp bolt 12 is clamped tight and friction faces, explained more precisely later, are pressed against one another. The clamp bolt 12 includes for this purpose in the proximity of its two ends enlarged end pieces, which can be formed, for example, by a bolt head and a nut. The jacket unit 3 is herewith held nondisplaceably with respect to the bracket unit 4. These parts of the securement device can be implemented in known manner.

Figure 1:
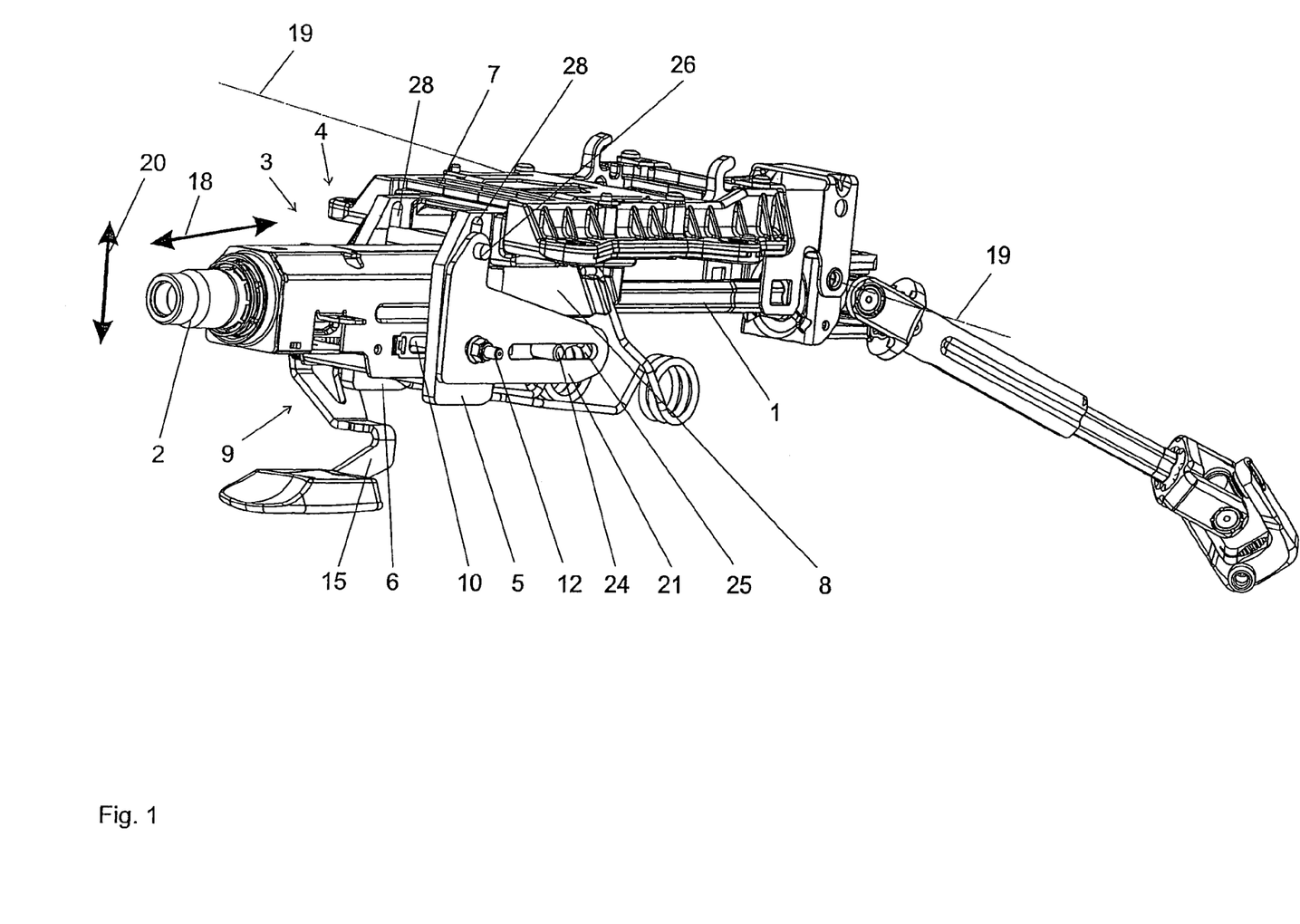
FIG. 1 is an oblique view of a steering column according to a first embodiment of the invention.
Figures 2, 3:
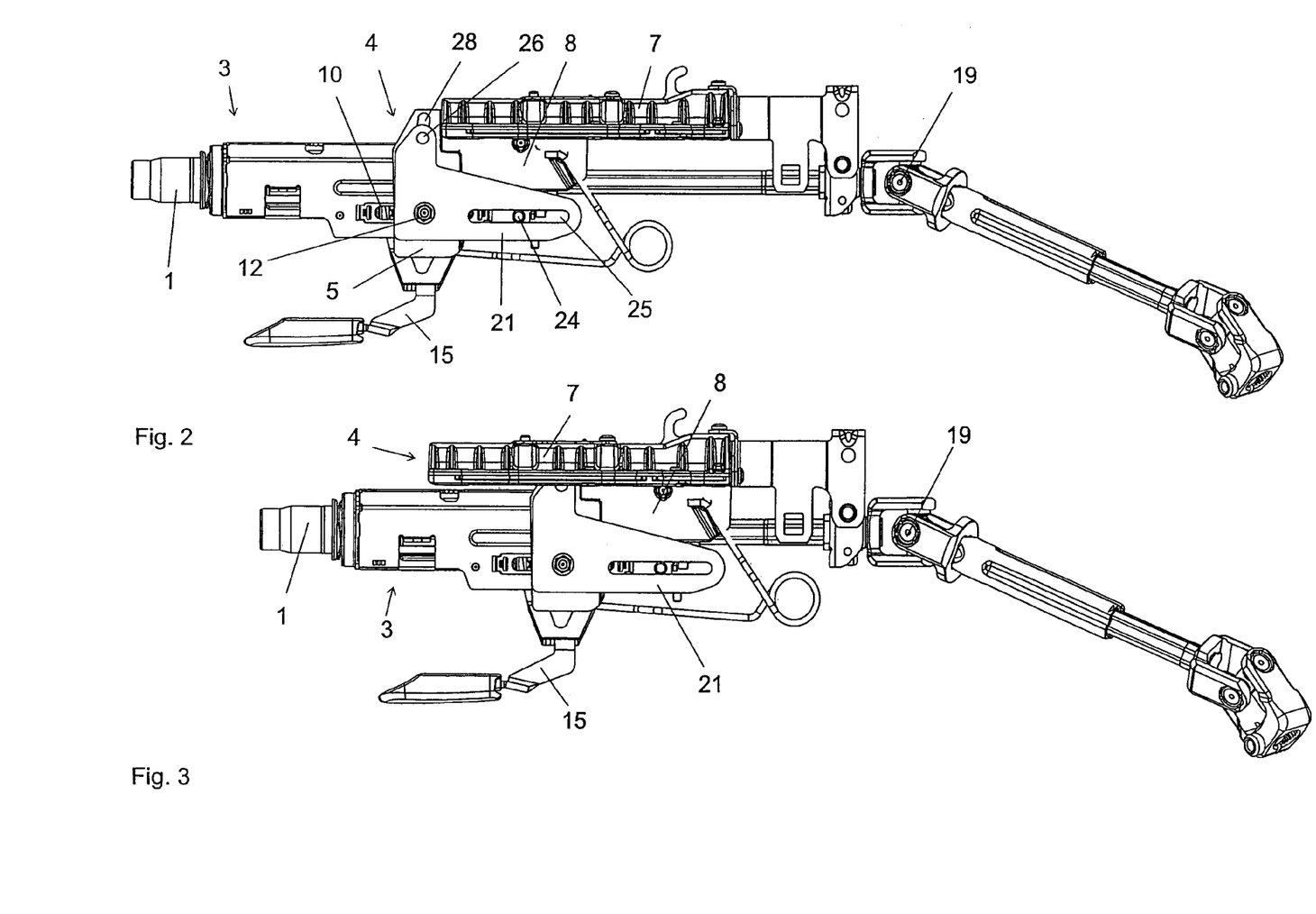
FIG. 2 is a side view of the steering column.
FIG. 3 is a side view corresponding to FIG. 2 after a crash.
Figure 4:
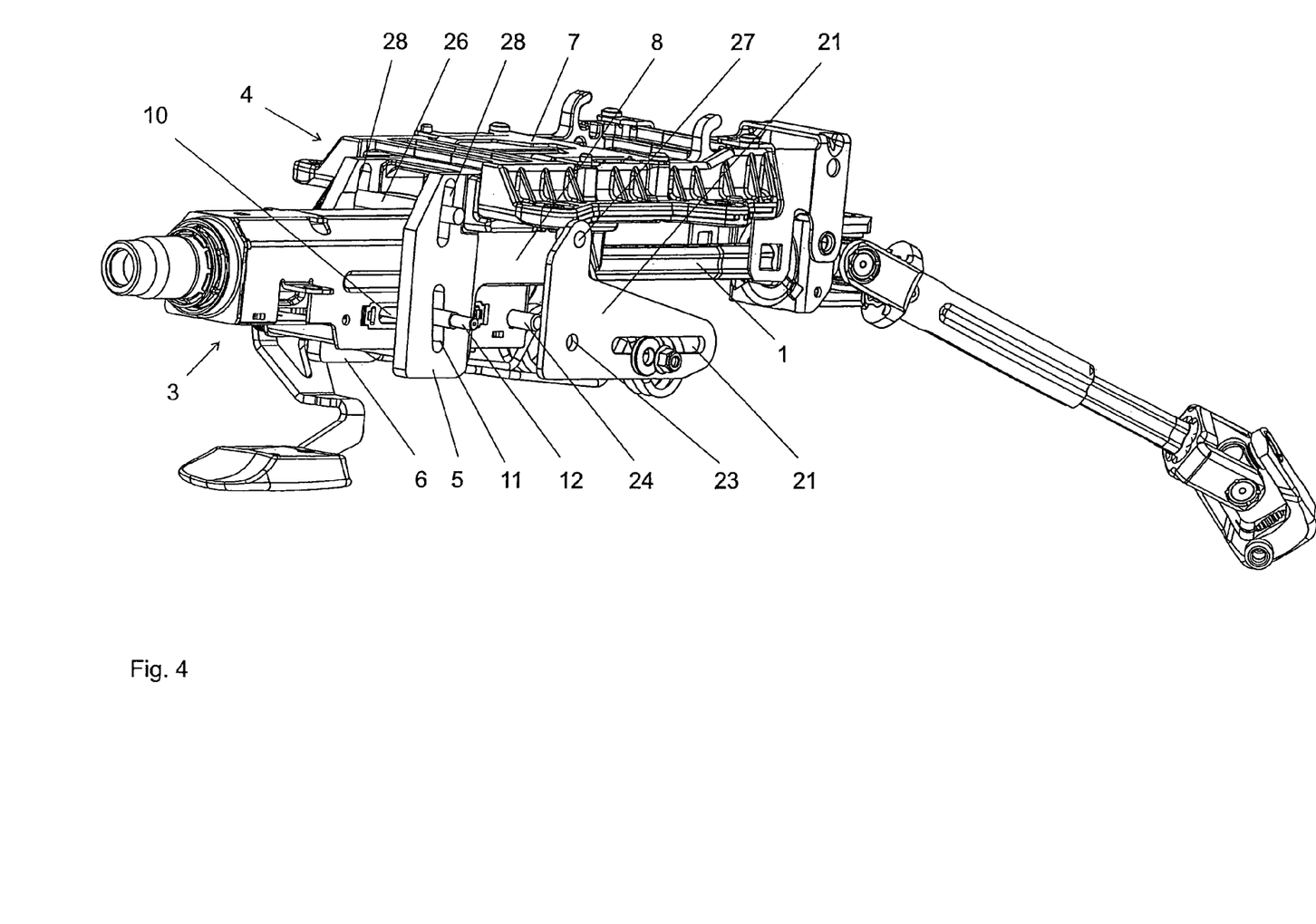
FIG. 4 is an oblique view corresponding to FIG. 1, depicted after the bracing part has been removed.
Figure 5:
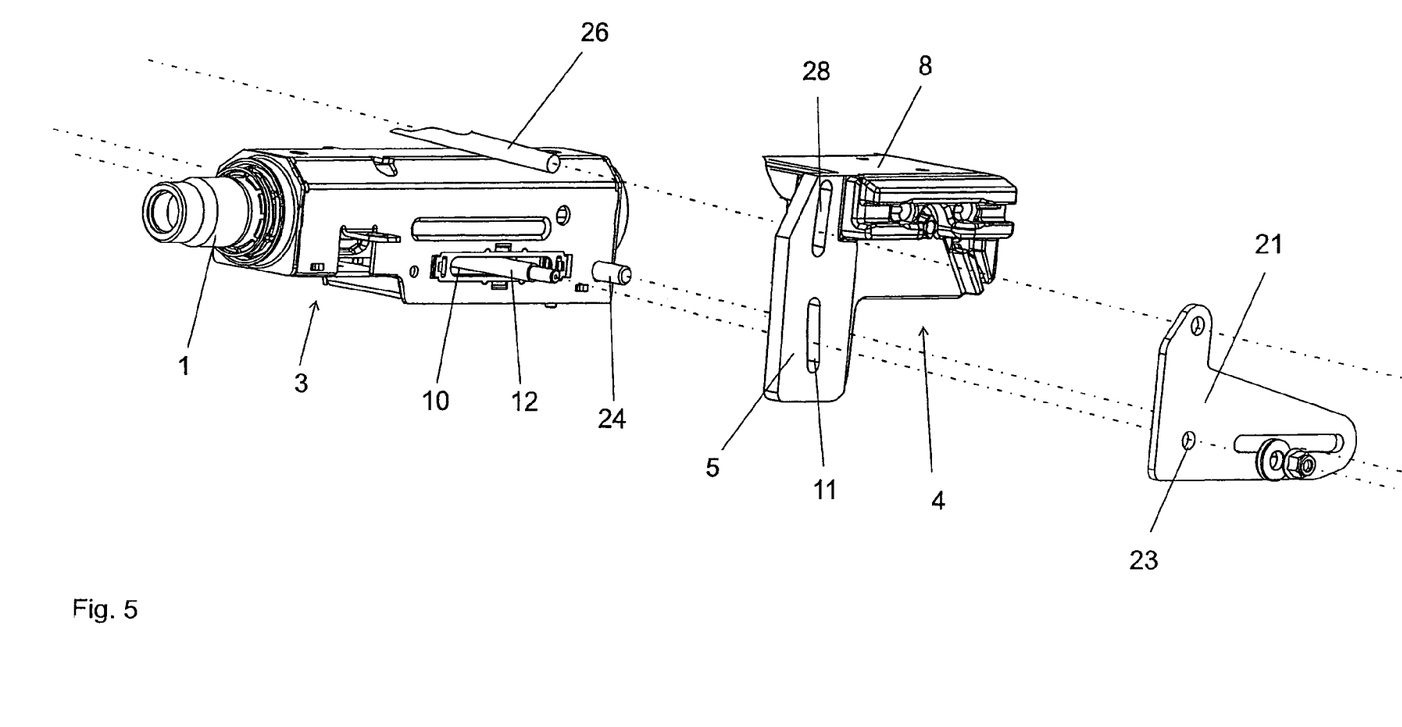
FIG. 5 is an oblique view corresponding to FIG. 1 of parts of the steering column, which are shown in the manner of an exploded view.

In the opened state of the securement device 9 the jacket unit 3 is displaceable with respect to the bracket unit 4 in the longitudinal direction of the steering column. This displacement direction 18 is indicated in FIG. 1 through the double arrow 18. Herein the clamp bolt 12 becomes displaced in the elongated hole 10, oriented parallel to the longitudinal direction 18, of jacket unit 3. The jacket unit 3 is further swivellable with respect to the bracket unit 4 in the opened state of the securement device 9 about a swivel axis 19 transversely to the longitudinal direction 18 of the steering column and parallel to clamp bolt 12. The steering column can hereby be adjusted in its inclination or height direction. This adjustment direction 20 is indicated in FIG. 1 through the double arrow 20. During this swivelling of jacket unit 3 about the swivel axis 19 the clamp bolt 12 is displaced in the elongated holes 11 in the side jaws 5, 6, which holes extend in adjustment direction 20. These elongated holes 11 can extend in a straight line (wherein during the swivelling of jacket unit 3 about the swivel axis 19 a slight displacement could occur of the clamp bolt 12 in the elongated hole 10), but in the depicted embodiment example have a circular arc form course about the swivel axis 19 as the center point.

To make the displacement of the jacket unit 4 in the longitudinal direction 18 possible, the steering spindle 1 is implemented in known manner such that it is telescopable. Thereby the displacement of the support part 8 with respect to the mounting part 7 in the event of a crash also becomes possible.

The steering column according to the invention further comprises at least one bracing part 21, 22. In the depicted embodiment example several such bracing parts 21, 22 are provided. In the representations according to FIG. 1 to 5 one such bracing part 21 is disposed on the side facing the viewer of the steering column on the outside of side jaw 5. This bracing part 21 is formed in the shape of a planar (flat or located in one plane) plate and is penetrated by clamp bolt 12 through a hole 23. The hole 23 is herein to delimit the clamp bolt 12 such that the bracing part cannot be displaced too much with respect to the clamp bolt. This means the hole 23 should not encompass the clamp bolt with too much play. In a preferred embodiment the cross sectional contour of hole 23 corresponds approximately to the cross sectional contour of clamp bolt 12, which in the simplest case is circular, wherein preferably the play between hole 23 and clamp bolt 12 is less than 10% of the diameter circumscribing the contour of the cross section of clamp bolt 12.

The bracing part 21 is connected with the jacket unit 3 such that it is displaceable in the displacement direction 18 parallel to the longitudinal direction of the steering column and connected under form closure nondisplaceably in the displacement direction 20 corresponding to the inclination or height adjustment. For this purpose on the jacket unit 3 a bolt 24 is disposed which penetrates an elongated hole 25 in the bracing part 21, which hole extends parallel to the displacement direction 18. In combination with the connection of the bracing part 21 via the clamp bolt 12, which is only displaceable with respect to the jacket unit 3 in the displacement direction 18 parallel to the longitudinal direction, consequently, in the displacement direction 20, corresponding to the inclination or height adjustment, a connection under form closure between the bracing part 21 and the jacket unit 3 is attained.

The bracing part 21 is further displaceably connected with the bracket unit 4 in the displacement direction 20, corresponding to the inclination or height adjustment, and in the displacement direction 18, corresponding to the length adjustment, is connected nondisplaceably with the bracket unit 4 through a connection under form closure. For this purpose a bolt 26 is connected with the bracing part 21 nondisplaceably into the two displacement directions 28, 20, for example thereby that it penetrates with slight play a hole 27 in the bracing part 21. The bolt 26 could, for example, also be welded onto the bracing part 21. The bolt 26 extends through an additional elongated hole 28 in the side jaw 5, 6 adjacent to the bracing part 21. The elongated hole 28 preferably has a course curved in the shape of a circular arc about the swivel axis 19 as the center. In combination with the connection of the bracing part 21 via clamp bolt 12, which is only displaceable in an elongated hole 11 in the displacement direction 20, corresponding to the inclination or height adjustment, with respect to the bracket unit 4 with its side jaws 5, 6, and consequently in the displacement direction 18 parallel to the longitudinal direction a connection under form closure is attained between the bracing part 21 and the bracket unit 4. In the case of the formation of the elongated hole 11 with a straight-line course, the elongated hole 28 could also be formed with a straight-line course.

If, in the event of a crash, onto the jacket unit 3 a torque acts about the longitudinal axis 16 of the clamp bolt 12 or also about an instantaneous axis in the proximity of clamp bolt 12 and parallel to this bolt, this torque is transferred via the bolt 24 onto the bracing part 21 and from it via the bolt 26 onto the bracket unit 4, such that the torque with the mediation of the bracket part 21 can be supported by the bracket unit 4 and a counteraction occurs against the rotation of the jacket unit 3 with respect to the bracket unit 4.

On the other side of jacket unit 3 are disposed in the depicted embodiment example further bracing parts 22 which are implemented in a manner entirely analogous to the bracing part 21 and, in the manner described in connection with bracing part 21, are connected with the jacket unit 3 of the bracket unit 4 and are penetrated by clamp bolt 12. However, here several such bracing parts 22 are provided which preferably are implemented with a lesser thickness than bracing part 21 and form a bracing part pack 31. These bracing parts 22 cooperate with disk lamellae 29 of a disk lamella pack 30, wherein the bracing parts 22 of the bracing part pack 31 and the disk lamellae 29 of a disk lamella pack 30 in the mounted state alternate with one another, i.e. are layered sandwich-like in the manner of a disk lamellae coupling.

Figures 6, 7, 8:
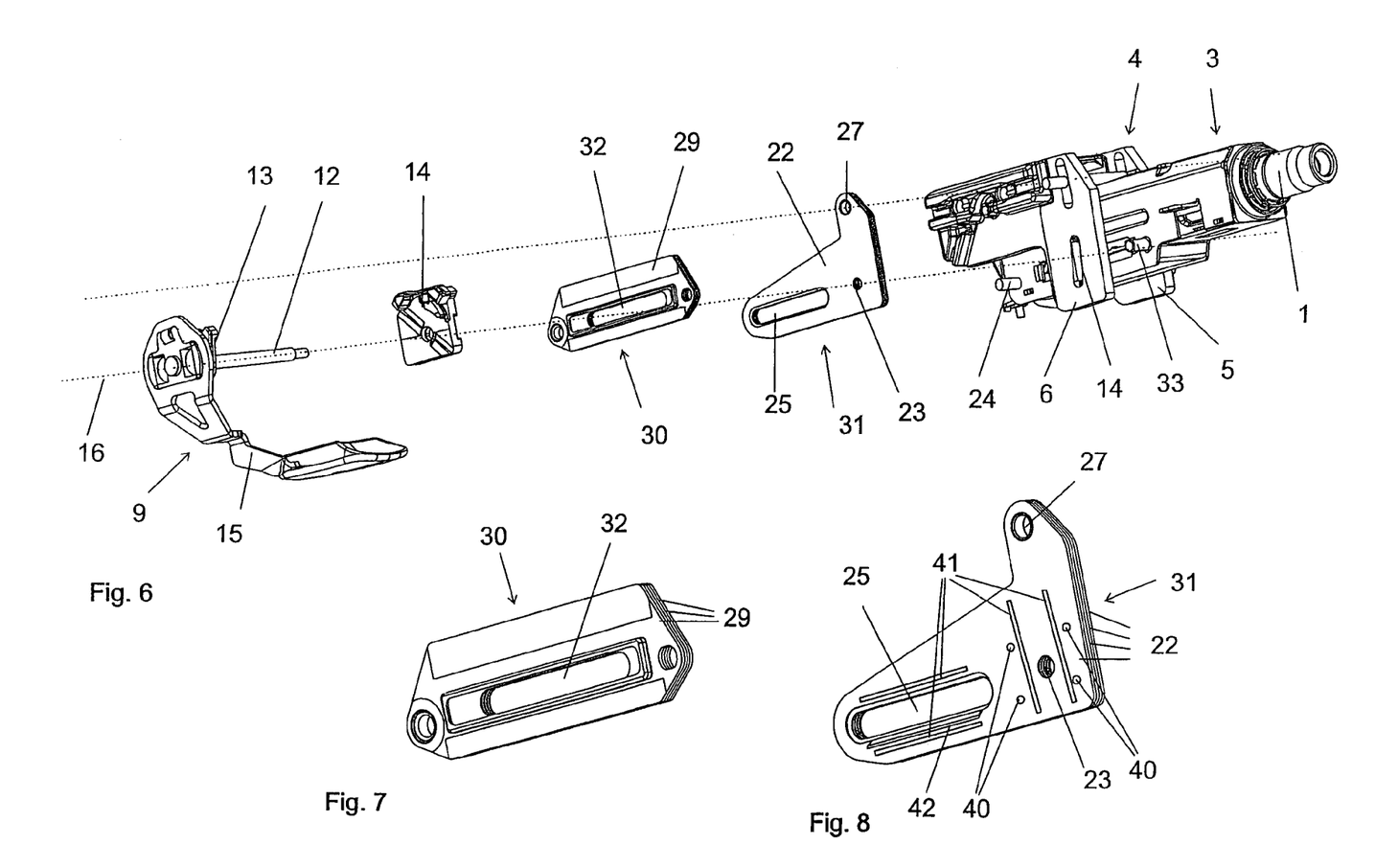
FIG. 6 is an oblique view of the steering column from the other side, parts of the steering column being shown in the manner of an exploded view.
FIG. 7 is an enlarged representation of the disk lamella pack for the securement in position of the steering column in the longitudinal direction.
FIG. 8 is an enlarged representation of the bracing part pack in a somewhat modified embodiment.
Figure 9:
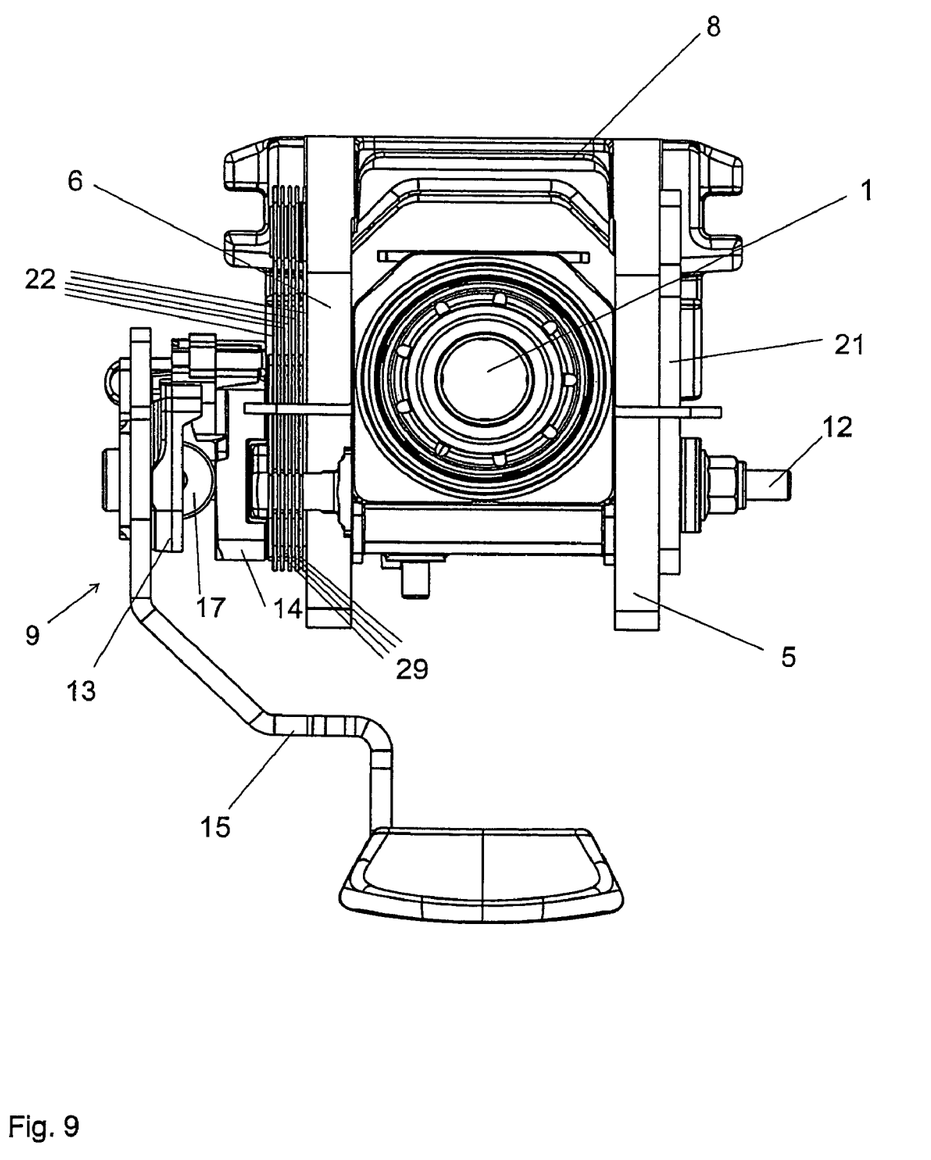
FIG. 9 is an end-side view of the steering column (without the mounting part 7)
Figure 10:
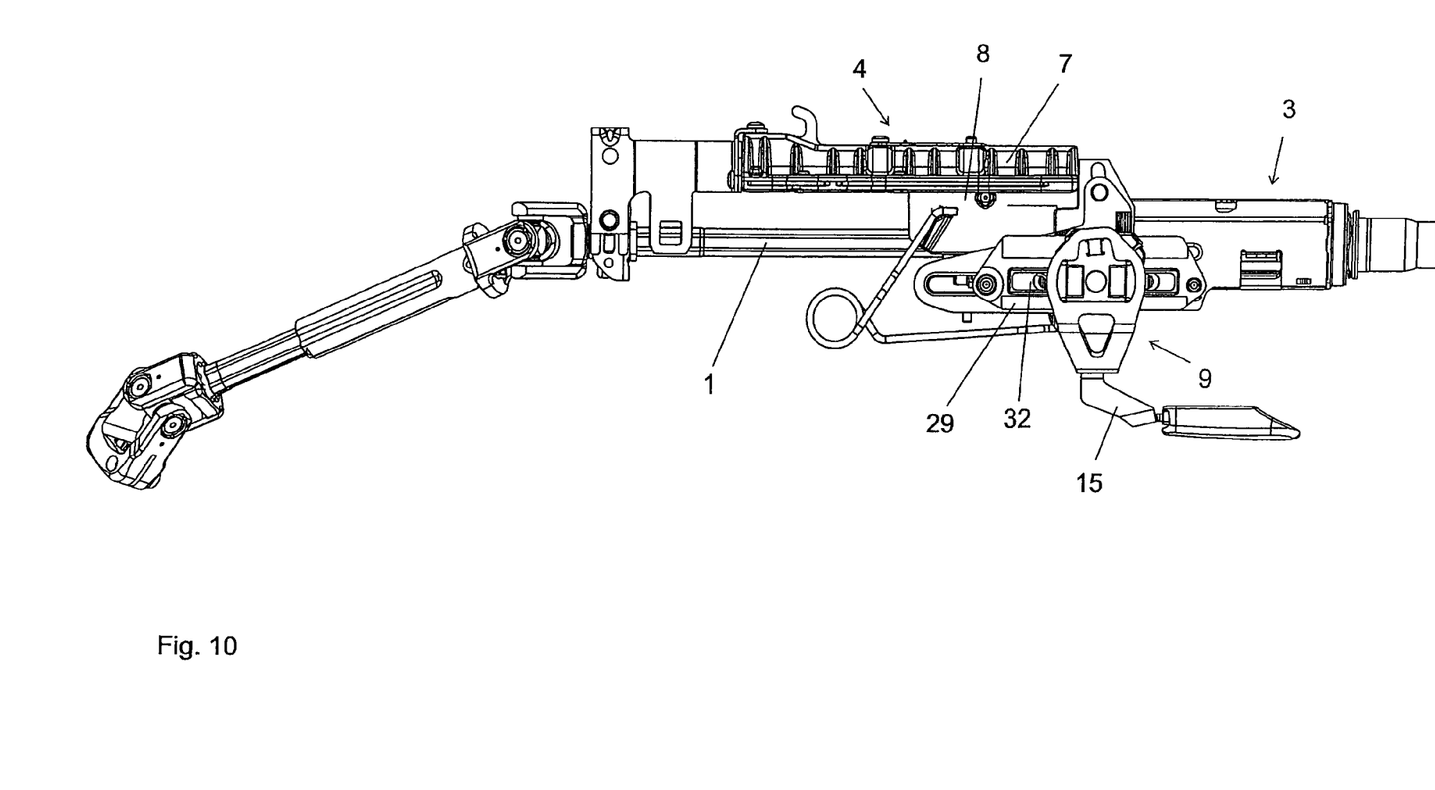
FIG. 10 is a side view from the side opposite to that compared to FIG. 2.

In this embodiment, the bracing parts 22 are formed planarly. However, the bracing part can also, especially if it is installed like a lamella into a lamella pack, be formed with strip-like elevations 41, as indicated in FIG. 8. Through such strip-like elevations 41, in particular parallel along the elongated hole 21, pressure points or pressure lines can be formed to improve the function of the clamping system. Likewise, pressure points 40, as are also indicated in FIG. 8, can be introduced, for example through simple stamping, into the bracing part at positions especially advantageous for the clamping system. Furthermore, the integration of a guard 42 against rotation out of position, also indicated in FIG. 8, for potentially provided lamella packs 30 can be provided, for example, through simple elevations or stampings, which engage into corresponding depths of clearances or even the already provided elongated holes in the lamellae. The selection of the individual additional characteristics is to be defined in the particular structure. Therein probably only individual profilings and scorings indicated schematically in FIG. 8 will be utilized in practice. Such bracing parts are encompassed within the scope of the invention.

The lamellae 29 include elongated holes 32 extending in the displacement direction 18, which holes are congruent with the elongated holes 10 in the jacket unit and which are penetrated by clamp bolt 12. The lamellae 29 are secured in position on the jacket unit 3, for example by means of bolts 24, 33 disposed on jacket unit 3. In the axial direction of bolts 24, 33 a shifting of the lamellae 29 can be possible. Bolt 24 in the depicted embodiment is that bolt which projects into the elongated holes 25 of the bracing parts 22. To secure the lamellae 29 in position a separate bolt could also be provided or the lamellae 29 could also be connected with the jacket unit 3, in a manner different from that shown, such that they are nondisplaceable in the displacement directions 18, 20 by means of connections under form closure.

With a displacement of the jacket unit 3 into the displacement direction 18 parallel to the longitudinal direction of the steering column, the lamellae 29 are simultaneously moved with the jacket unit, while the bracing parts 22 are connected with the bracket unit 4 such that they are nondisplaceable into this displacement direction 18. In the closed state of the securement device 9, the faces of the bracing parts and of the lamellae 29, which are in contact on one another, consequently form friction faces for securing the displacement in the displacement direction 18.

Further friction faces for the securement in the displacement direction 18 are formed in this embodiment through the contact of the connecting link disk 14 on that of its adjacent lamella 29 and through the contact of the inner faces of the side jaws 5, 6 on the outer faces of the jacket unit 3. For the securement of the displacement in the displacement direction 20 serve in this embodiment example friction faces, which are formed by the contact of the bracing part 22 adjacent to the side jaw 6 on this side jaw 6, the contact of the bracing part 21 on the side jaw 5 and the contact of the inner faces of the side jaws 5, 6 on the outer faces of the jacket unit 3.

Bolt 26 in this embodiment example is formed end-to-end and penetrates elongated holes 28 in both side jaws 5, 6 and in end sections at both sides is connected with the bracing part 21, 22 disposed on both sides of jacket unit 3 such that it is nondisplaceable in the displacement directions 18, 20.

It would, in principle, also be conceivable and feasible to orient the elongated holes 10, 11 in jacket unit 3 and side jaws 5, 6 in the particular other displacement direction 18, 20. Also for the direction, in which the bracing part 21, 22 is connected displaceably or nondisplaceably with the jacket unit 3 or side jaw 5, 6, respectively, precisely the particular other of the displacement directions 18, 20 would have to be drawn on.

Figure 11:
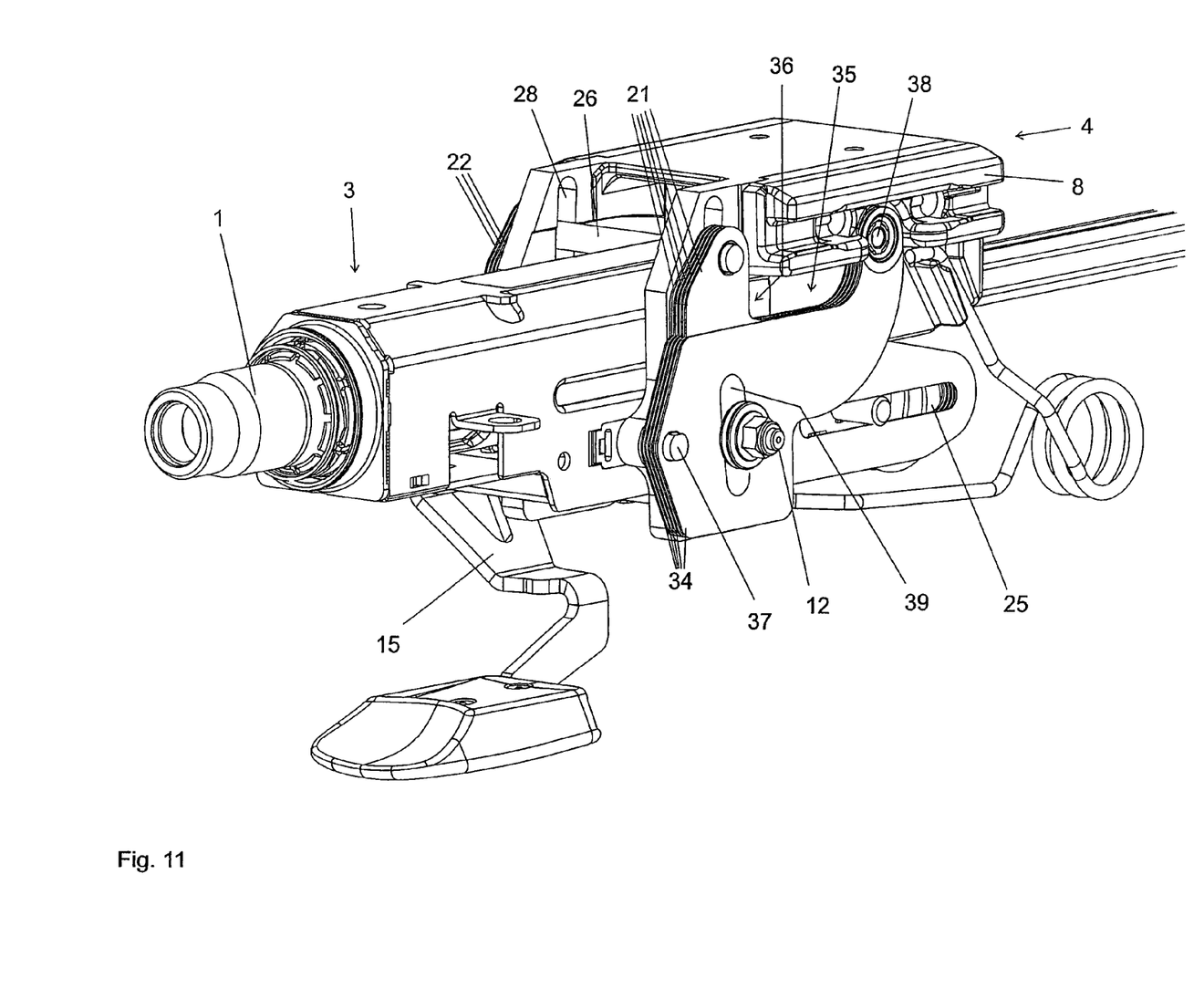
FIG. 11 is an oblique view of a steering column according to a second embodiment example of the invention.

In the embodiment according to FIG. 11, the formation on the side facing away from the viewer corresponds to the formation already described in connection with the first embodiment. On the side facing the viewer, this embodiment, however, is changed compared to the previously described embodiment to the extent that several bracing parts 21 are also provided which form a bracing part pack 36 and cooperate with lamellae 34. The lamellae 34 of this lamellae pack 35 are layered sandwich-like with the bracing parts 21 of the bracing part pack 36 and are attached on the bracket unit 4, for example by means of a bolt 37 disposed on the side jaw 5, which bolt 37 penetrates the holes in the lamellae 34, and of a connection part 38 disposed on the support part 8. A connection of the lamellae 34 with the bracket unit 4, which connection is nondisplaceable under form closure into the displacement directions 18, 20, could also be implemented in a different manner. The lamellae 34 include elongated holes 39 which extend in the displacement direction 20 and which are congruent with the elongated holes 11 in the side jaws 5, 6. The elongated holes 39 are penetrated by clamp bolts 12.

In the opened state of the securement device 9 with a displacement of jacket unit 3 into the displacement direction 20 the bracing parts 21 shift with respect to lamellae 34 into this displacement direction 20. In the closed state of the securement device 9, when the lamellae 34 are clamped tight with the bracing parts 21 through the clamp bolt 12, the faces in contact on one another of the lamellae 34 and of the bracing parts 21, consequently, form friction faces for the securement in position of a displacement in this displacement direction 20 corresponding to the height or inclination adjustment.

Various modifications of the described embodiments are conceivable and feasible without leaving the scope of the invention. For example, between the bracing parts 21, 22 of a particular bracing part pack 31, 36 could be layered lamellae 29, which are connected with jacket unit 3, as well as also lamellae 34 which are connected with the bracket unit 4.

A particular lamellae pack 30, 35 or bracing part pack 31, 36 could also comprise more or fewer individual lamellae or bracing parts. Thus, for example, only a single lamella disposed between two bracing parts or a single bracing part disposed between two lamellae could also be provided.

The securement device 9 could additionally, or instead of the described securement elements acting under frictional closure, also comprise other securement elements, for example securement elements with form-closure action. It is, for example, conceivable and feasible to dispose on one side of the jacket unit 3 bracing part 21 and to provide on the other side of the jacket unit 3 to provide toothings which, in the closed state of the securement device 9, come into engagement with one another.

The bolt-elongated hole connections between a particular bracing part 21, 22 and the jacket unit 3 or bracket unit 4 could also be implemented in a manner different from that shown, for example bolt and elongated hole between the two particular parts to be connected could also be disposed in a manner interchanged compared to the disposition shown.

The invention is furthermore not limited to the fact that the at least one bracing part is disposed on the side facing away from the jacket unit of one and/or both side jaws of the bracket unit. Rather, it is also conceivable and feasible to dispose the bracing part 21, 22 between the jacket unit 3 and the side jaw 5, 6. All combinations such as: only a single bracing part 21, 22, two or more bracing parts 21, 22, bracket unit 4 with one or two or even more side jaws 5, 6, disposition between jacket unit 4 and side jaw 5, 6, disposition on the side facing away from the jacket unit 3 of the side jaw 5, 6, etc. are conceivable and feasible and encompassed within the scope of the invention.

LEGEND TO THE REFERENCE NUMBERS

1 Steering spindle
2 End
3 Jacket unit
4 Bracket unit
5 Side jaw
6 Side jaw
7 Mounting part
8 Support part
9 Securement device
10 Elongated hole
11 Elongated hole
12 Clamp bolt
13 Connecting link disk
14 Connecting link disk
15 Clamping lever
16 Longitudinal axis
17 Roll
18 Displacement direction
19 Swivel axis
20 Displacement direction
21 Bracing part
22 Bracing part
23 Hole
24 Bolt
25 Elongated hole
26 Bolt
27 Hole
28 Elongated hole
29 Lamella
30 Disk lamella pack
31 Bracing part pack
32 Elongated hole
33 Bolt
34 Lamella
35 Disk lamella pack
36 Bracing part pack
37 Bolt
38 Connection part
39 Elongated hole

The invention claimed is:

1. An adjustable steering column for a motor vehicle, comprising:
    a steering spindle;
    a jacket unit bearing the steering spindle;
    a bracket unit mountable on a chassis of the motor vehicle, the bracket unit having at least one side jaw which extends laterally of the jacket unit and bears the jacket unit;
    a securement device operable between a closed state in which the jacket unit is connected nondisplaceably with the bracket unit and an opened state in which the jacket unit is displaceable with respect to the bracket unit in a displacement direction for a length adjustment of the steering column and in a displacement direction for a height or inclination adjustment of the steering column, the securement device comprising a clamp bolt penetrating first elongated holes in the jacket unit and in the at least one side jaw; and
    at least one bracing part penetrated by the clamp bolt, the bracing part being connected with the jacket unit displaceably in a first one of the displacement directions and nondisplaceably in a second one of the displacement directions, and the bracing part being connected with the at least one side jaw displaceably in the second one of the displacement directions and nondisplaceably in the first one of the displacement directions,
    wherein the at least one bracing part comprises a substantially planar plate, the at least one bracing part being connected to the jacket unit by a first bolt, the first bolt being connected to one of the at least one bracing part and the jacket unit so as to be nondisplaceable in both displacement directions, and the first bolt penetrating a second elongated hole disposed on the other of the at least one bracing part and the jacket unit, the second elongated hole extending in the first one of the displacement directions, and wherein the at least one bracing part is connected to the at least one side jaw by a second bolt, the second bolt being connected to one of the at least one bracing part and the at least one side jaw so as to be nondisplaceable in both displacement directions, and the second bolt penetrating a third elongated hole disposed on the other of the at least one bracing part and the at least one side jaw, the third elongated hole extending in the second one of the displacement directions.

2. The adjustable steering column as claimed in claim 1, wherein the second bolt is connected to the at least one bracing part so as to be nondisplaceable in both displacement directions and the third elongated hole is disposed on the at least one side jaw.

3. The adjustable steering column as claimed in claim 2, wherein the at least one side jaw comprises side jaws arranged on both sides of the jacket unit, respectively, and wherein the third elongated hole comprises a plurality of third elongated holes, each of the side jaws having a third elongated hole disposed thereon, wherein the second bolt penetrates the third elongated holes of the side jaws on both sides of the jacket unit.

4. The adjustable steering column as claimed in claim 3, wherein the at least one bracing part comprises a plurality of bracing parts, and wherein the second bolt is connected at each of bilateral end sections with at least one bracing part so as to be nondisplaceable in both displacement directions.

5. The adjustable steering column as claimed in claim 1, wherein the first bolt is connected to the jacket unit and the second elongated hole is disposed on the at least one bracing part.

6. The adjustable steering column as claimed in claim 1, wherein the at least one bracing part is disposed on the outside of the at least one side jaw.

7. The adjustable steering column as claimed in claim 1, wherein the at least one bracing part comprises a plurality of bracing parts, wherein on at least one side of the jacket unit at least two bracing parts are provided, between which at least one lamella is disposed which is arranged on the jacket unit or bracket unit, and/or on at least one side of the jacket unit at least two lamellae are disposed which are arranged on the jacket unit or on the bracket unit and between which at least one bracing part is disposed, wherein faces of ones of the bracing parts and the lamellae which contact one another form friction faces for the securement in position of the jacket unit with respect to the bracket unit in at least one of the displacement directions in the closed state of the securement device.

8. The adjustable steering column as claimed in claim 7, wherein at least one bracing part is provided on both sides of the jacket unit.

9. The adjustable steering column as claimed in claim 1, wherein at least one bracing part is provided on both sides of the jacked unit, and wherein at least one lamella is provided on both sides of the jacket unit so as to form a friction face with an adjacent bracing part.

10. The adjustable steering column as claimed in claim 9, wherein the at least one lamellae on the one side of the jacket unit is attached so as to form a securement element acting in the first one of the displacement directions and the at least one lamella on the other side of the jacket unit is attached so as to form a securement element acting in the second one of the displacement directions on the bracket unit.

11. The adjustable steering column as claimed in claim 1, wherein the at least one bracing part comprises at least two bracing parts forming at least one bracing part pack, the at least one bracing part pack being arranged to cooperate with a disk lamellae pack comprising at least two lamellae, wherein the bracing parts of the bracing part pack and the lamellae of the disk lamellae pack are layered in the manner of a sandwich.

12. The adjustable steering column as claimed in claim 1, wherein the at least one bracing part is formed as a sheet metal stamping.

* * * * *